US005028295A

United States Patent [19]

Cracchiolo

[11] Patent Number: 5,028,295
[45] Date of Patent: Jul. 2, 1991

[54] CARPET SEAMING IRON WITH ULTRA THIN GUIDE STRUT AND IMPROVED HEAT CONTROL

[76] Inventor: Jerome S. Cracchiolo, 2316 Bray Ave., Santa Clara, Calif. 95050

[21] Appl. No.: 419,339

[22] Filed: Oct. 10, 1989

[51] Int. Cl.⁵ .................. B44C 7/00; D06F 75/24; H01C 3/08
[52] U.S. Cl. .................. 156/574; 156/579; 219/255; 338/217
[58] Field of Search ............ 156/304.4, 304.6, 304.7, 156/359, 579, 499, 574; 219/255, 254, 245, 228, 251, 252, 543, 549; 38/82; 126/411; 338/217

[56] References Cited

U.S. PATENT DOCUMENTS

| | | | |
|---|---|---|---|
| 1,158,557 | 11/1915 | Rose | 38/82 |
| 2,385,606 | 9/1945 | Campbell | 38/82 |
| 2,725,453 | 11/1955 | Haller | 219/254 |
| 3,393,292 | 7/1968 | Ritscher | 219/245 |
| 3,506,804 | 4/1970 | Schippers | 338/217 X |
| 3,551,645 | 12/1970 | Stoll | 219/228 |
| 4,322,900 | 4/1982 | Hacker et al. | 38/82 |
| 4,438,323 | 3/1984 | Milnes | 156/579 |
| 4,584,040 | 4/1986 | Anderson | 156/579 |
| 4,829,157 | 5/1989 | Loyd | 156/579 |

Primary Examiner—Michael W. Ball
Assistant Examiner—Chester T. Barry
Attorney, Agent, or Firm—Fliesler, Dubb, Meyer & Lovejoy

[57] ABSTRACT

A carpet seaming iron comprising a sole plate, an ultra thin guide strut and a flat planar heater core comprising heating ribbon arranged in three separate patterns for providing high, medium and low heat to the front, middle and rear sections of the sole plate. A thermostat is provided with an auxiliary heater controlled by a switch for controlling the power applied to the heater core so as to selectively provide a high and low temperature in each of the heat zones. A heat insulator on the heater core and a heat shield on the top of the iron base keeps temperatures below that which melt carpet backing, e.g. 300° F. Indicating lights are provided for indicating when power is applied to the iron and when power is applied to the heater core. The ultra thin guide strut restricts the extent to which the edges of a pair of carpet halves are separated during the seaming process for providing easier operation and a better seam between the carpet halves.

12 Claims, 7 Drawing Sheets

CARPET SEAMING IRON WITH ULTRA THIN GUIDE STRUT AND IMPROVED HEAT CONTROL

BACKGROUND OF THE INVENTION

1. Field of the Invention

The invention relates to carpet seaming irons in general and in particular to a carpet seaming iron with an ultra thin guide strut for minimizing the separation of carpet edges during the seaming thereof, improved guiding of the iron between the seams and more efficient heat control for better adhesion of the carpet to thermally sensitive carpet tape.

2. Description of the Prior Art

A carpet seaming iron is used to join and form an invisible seam between adjacent edges of a carpet during the installation of two or more pieces thereof. In practice, a length of thermally sensitive adhesive tape is laid beneath the edges, extending 1½ to 3 inches on opposite sides thereof. The iron is then moved along the seam beneath the edges of the carpet, heating the tape. As the iron is moved, the carpet edges are closed behind the iron and affixed to the tape.

Typical seaming irons comprise a heating element in a base member having a heat shield on the upper surface thereof and a handle which is rigidly attached to the heat shield. In a conventional iron the handle is relatively thick, i.e. wide, in a direction transverse the longitudinal axis of the iron. The thick handle is found to have a number of disadvantages. For example, during seaming, the edges of the carpet between which the handle is moved are forced apart to the front, sides and rear of the iron. With a thick handle the edges of the carpet behind the iron are separated to such an extent that it is not possible to close them for a considerable distance behind the iron. If the iron is moved too slowly permitting the heated tape to cool, the extensive separation of the carpet edges behind the iron also makes it difficult to get a tight seam with good adhesion to the tape.

To obtain good adhesion, it is important to heat all of the seaming tape. Since the tape lies beneath the carpet edges and therefore is not readily visible to the operator, the operator typically uses the edges of the carpet to help guide the iron so that it is moved over the tape. Unfortunately, another disadvantage of a wide handled iron is that the extent of the upward inclination and separation of the edges of the carpet as the edges are separated by the handle reduces the effect which the edges have on guiding the iron as it is moved over the tape. This makes the operator's job more difficult, resulting sometimes in a failure to heat parts of the tape.

Another disadvantage of conventional seaming irons is their inability to provide proper heating of the tape. Prior known irons typically comprise a tubular fixed temperature heating element which is located adjacent to the sole plate in the base member of the iron. The resulting effect is that the temperature of the sole plate is not uniform. Instead, there is a high temperature along the line of contact of the heating element with the sole plate with a decreasing temperature gradient outwardly therefrom. Also, the temperature is the same along the line of contact from the front to the rear of the iron.

Still another disadvantage of conventional irons is the high heat shield temperature which typically exceeds the melting temperature of most carpet backings, e.g. 300° F.

SUMMARY OF THE INVENTION

In view of the foregoing, a principal object of the present invention is a new and improved carpet seaming iron. Among several features of the iron there is provided an improved type of iron heating element, an ultra thin guide strut, a heating control circuit which allows a fixed thermostat to be used with a high/low switch, a pair of lamps to signify iron status and a built-in heat insulator attached to the iron heating core.

As discussed above, the existing irons use a tubular fixed temperature heating element. As a result, the temperature at the bottom of the iron base is not uniform but instead has a high temperature at the point of contact with decreasing temperature outward from that point. Also, the temperature is the same at all points along the heating element. In contrast, the heating core of the present invention is made from a flat ribbon of resistive material arranged in distinctive patterns on a planar substrate so as to produce a plurality of uniform heat zones. A high heat zone is provided at the front of the iron in order to provide the latent heat necessary to start melting the hot-melt adhesive attached to the carpet seaming tape used to bond the carpet halves together. A medium temperature zone is provided in the middle of the iron to allow the adhesive to come up to the required temperature without burning the adhesive. A low heating zone is provided at the end of the iron to control the flow of the adhesive in preparation for transferring the hot-melt adhesive to the carpet backing. The end result of these features is a uniform temperature across each of the zones and a better bond between the carpet seaming tape and the carpet backing.

The ultra thin guide strut of the present invention comprises a thin sheet of metal approximately 0.50 inch in height which is used to connect the iron base assembly to the iron handle. As a result, the carpet is separated very little while seaming the carpet halves together. This allows the two halves of the carpet being joined to close naturally without force, which is not the case with current iron designs. Also, due to the self-closing action produced by the two carpet halves, and the thinness of the strut design, the strut will act as a guiding surface tending to center the iron on the carpet seaming tape.

Incorporated into the heater core design is an independent heating element and a high/low temperature switch which are used to control a fixed temperature thermostat. When the temperature switch is set to a high temperature, the heater element is not used, allowing the temperature in each of the heating zones of the sole plate to rise to their maximum temperature. At a low temperature setting, the heating element is turned on, thereby preheating the thermostat causing the thermostat to turn off at a lower iron base temperature. As a result, the single fixed temperature thermostat acts as a two-temperature thermostat (high/low). Current iron designs use a continuous variable temperature thermostat, which has certain inherent problems that the fixed temperature thermostat address.

When electrical power is supplied to the iron, a green light will come on. As the iron thermostat cycles the iron heater core, a red light will come on indicating that the heater core is heating up. The current iron designs do not have a "power on" indicator, only an indicator lamp to show when the heating element is cycling on.

The special heat insulator layer is attached to the top half surface of the heater core and serves to reduce the iron heat shield temperature to less than 300° F., the temperature at which most carpet backings melt, and at the same time directs a greater amount of heat into the iron base metal where it is needed. This effect adds to the overall efficiency of the iron and allows the iron to remain stationary indefinitely without damaging the carpet. The current iron tubular heater cores do not cause the heat to be directed in any given direction.

BRIEF DESCRIPTION OF THE DRAWINGS

The above and other objects, features and advantages of the present invention will become apparent from the following detailed description of the accompanying drawings, in which.

DETAILED DESCRIPTION OF THE INVENTION

Figure 1:
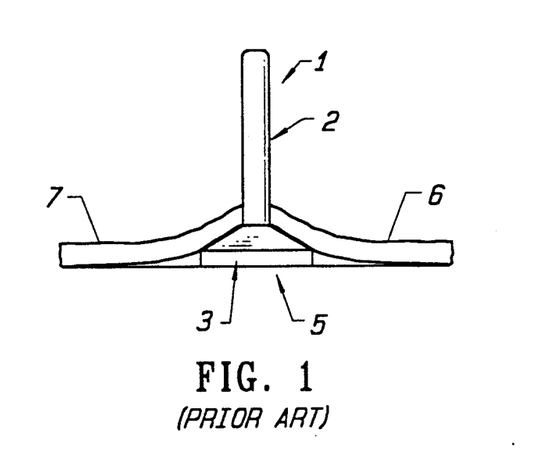
FIG. 1 is a front elevation view of a prior art carpet seaming iron.
Figure 2:
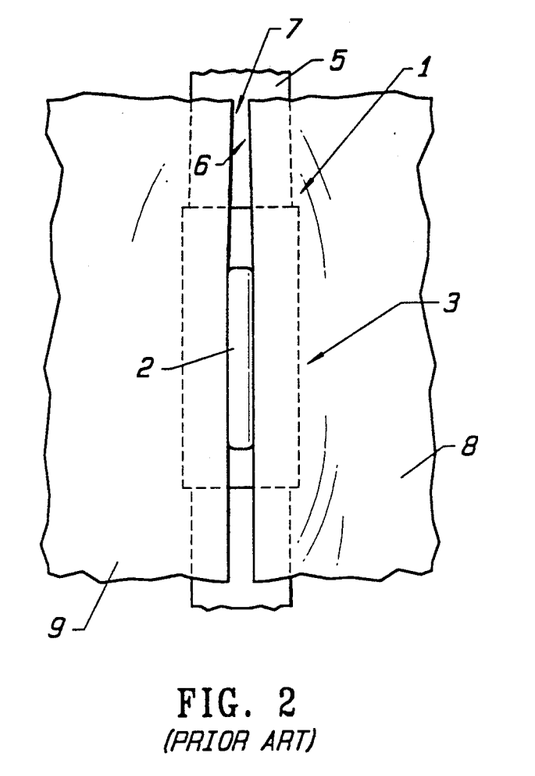
FIG. 2 is a top plan view of FIG. 1.
Figure 3:
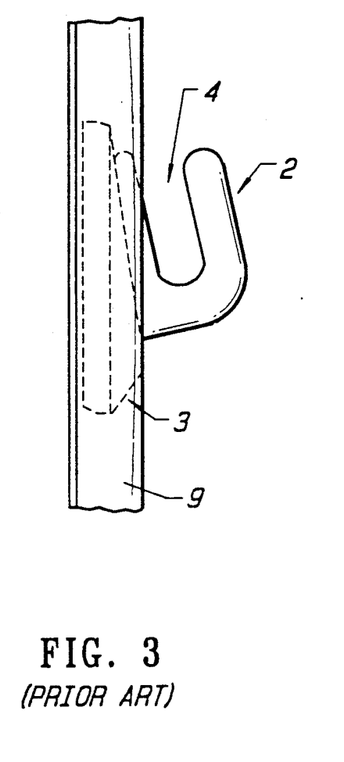
FIG. 3 is a side elevation view of FIG. 2.

Referring to FIGS. 1-3, there is shown a prior art carpet seaming iron designated generally as 1. In the iron 1 there is provided a handle 2 and a base member 3. In the handle 2 there is provided an open-ended elongated slot 4 into which an operator can insert his or her fingers while manually operating the iron.

In preparation for using the iron, a length of carpet seaming tape 5 is placed beneath the adjoining edges 6 and 7 of two pieces of carpet 8 and 9, respectively. The tape 5 typically extends approximately 1½ to 3 inches on either side of the edges 6 and 7. After the tape 5 is laid in place, the iron is used to heat an adhesive on the upper surface of the tape. After the adhesive is heated, the edges 6 and 7 of the carpet are pulled together and pressed against the adhesive for forming a tight, preferably invisible, seam therebetween.

As the iron 1 is moved between the edges 6 and 7 for heating the adhesive on the tape 5, the edges 6 and 7 are separated by an amount corresponding to the width of the handle 2 in a direction transverse the longitudinal axis thereof. Because the width of the handles of conventional irons is quite large, this separation is found to extend for a considerable distance behind the iron, making it difficult to close the edges 6 and 7 tightly together, as discussed above.

Figure 4:
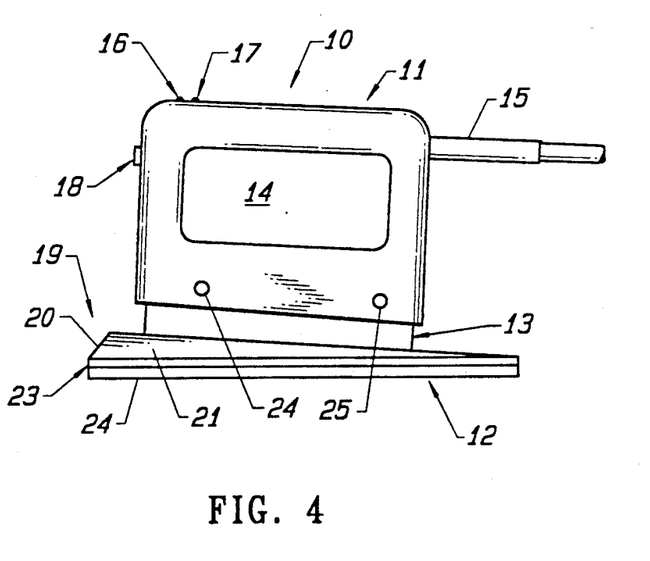
FIG. 4 is a side elevation view of a carpet seaming iron according to the present invention.
Figure 5:
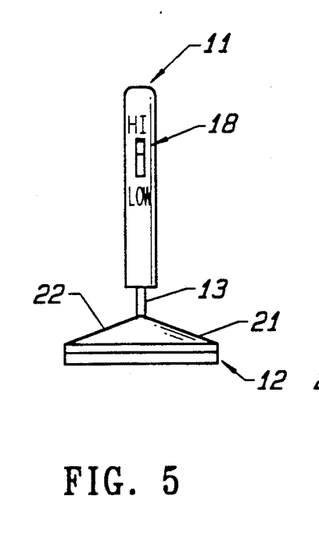
FIG. 5 is a front elevation view of FIG. 4.
Figure 6:
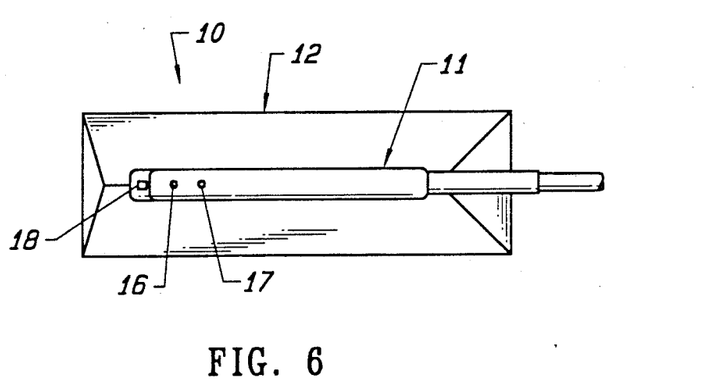
FIG. 6 is a top plan view of FIG. 4.

Referring to FIGS. 4-6, there is provided in accordance with the present invention a carpet seaming iron designated generally as 10. In the iron 10 there is provided a handle assembly 11, a base assembly 12 and an ultra thin guide strut member 13 located between the handle assembly 11 and the base assembly 12.

In the handle assembly 11 there is provided an opening 14. The opening 14 is provided to allow an operator's fingers to pass therethrough for grasping the handle 11. A power cord 15 extends from the rear of the handle 11. At the top of the handle 11 there is provided a pair of green and red indicator lights 16 and 17. At the forward end of the handle 11 there is provided a high/low switch 18.

In the base member 12 there is provided a heat shield 19 comprising a beveled forward surface 20 and a pair of beveled side surfaces 21 and 22, a heater core 23 and electrical circuits as will be further described below, and a sole plate 24 located on the bottom thereof. The surfaces 20, 21 and 22 are further downwardly beveled from the front to the rear of the base member 12 to facilitate self-closing of the carpet edges behind the iron.

The guide strut member 13 comprises a thin sheet of metal which is rigidly attached to and extends from the center of the heat shield 19 and is affixed to the handle member 11 as by rivets 24, 25. A passageway (not shown) is provided in the strut member 13 for the passage therethrough of electrical circuits from the base member 12 into the handle 11 as will be described below.

In a typical embodiment of the present invention, the handle 11 is made of plastic, the heat shield 19 is made of steel approximately 0.06 inch thick and the sole plate 23 comprises an aluminum plate approximately 0.25 inch thick. The height of the front end of the base assembly 12 from the bottom of the sole plate 23 to the top of the heat shield 19 is approximately 0.8 inch thick.

Referring to the guide strut member 13, the width of the guide strut member 13 in a direction transverse the longitudinal axis of the iron 10 is typically less than half the width of the handle 11, e.g. 0.125 inch. Its height is approximately 0.5 inch. The thinness of the strut 13, as will be further discussed below, significantly reduces the separation of the carpet edges as the iron is passed therebetween, improves guiding of the iron by the edges and significantly improves the tightness of the seam formed by the carpet after it is affixed to the adhesive tape.

Figure 7:
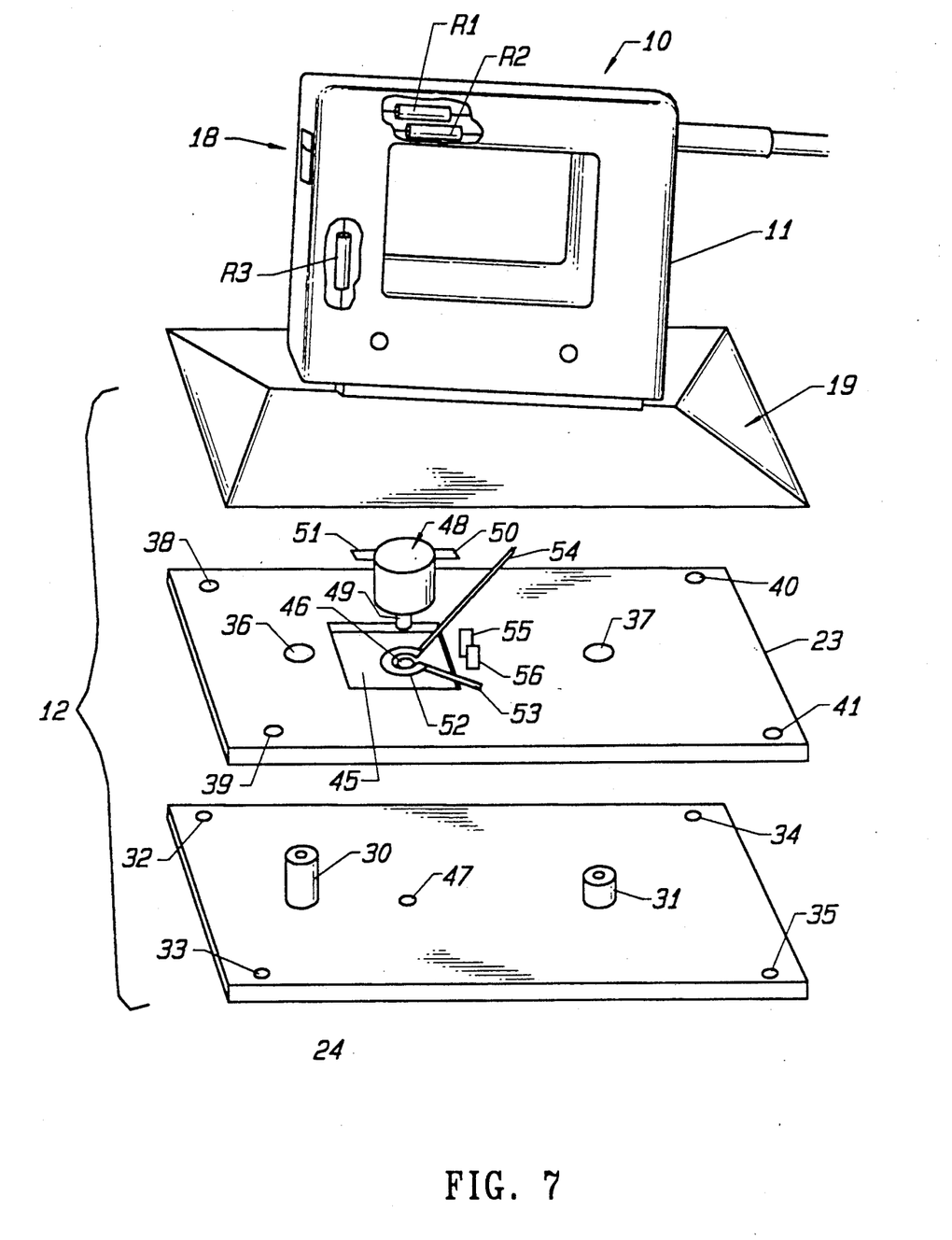
FIG. 7 is an exploded view of the iron of FIG. 4.

Referring to FIG. 7, in the sole plate 24 there is provided a pair of upstanding tubular mounting members 30 and 31 and a plurality of mounting holes 32, 33, 34 and 35. In the heater core 23 there is provided a pair of support receiving holes 36 and 37 and mounting screw receiving holes 38, 39, 40 and 41 for receiving the supporting posts 30 and 31 and mounting screws inserted in the holes 32-35, respectively, which are used for mounting the sole plate and the heater core to the iron shield 19.

Centrally located in the forward portion of the heater core 23, there is provided a rectangular hole 45. In the center of the hole 45 there is provided a mounting hole 46. A corresponding mounting hole 47 is provided in the sole plate 24. The holes 46 and 47 are provided for mounting a thermostat 48 by inserting a screw through the holes 46 and 47 into a post 49 extending from the lower surface thereof. A pair of electrical contacts 50 and 51 extend outwardly from the upper end of the thermostat 48. Located around the post 49 when the thermostat 48 is secured by a screw inserted in the holes 46 and 47, there is provided a heating element 52 having a pair of leads 53 and 54.

As will be further described below, there is provided in the handle 11 a plurality of resistors R1, R2 and R3. Extending upwardly adjacent to the rear of the hole 45 in the heater core assembly 23 there is provided a pair of upstanding electrical contacts 55 and 56.

Figure 8:
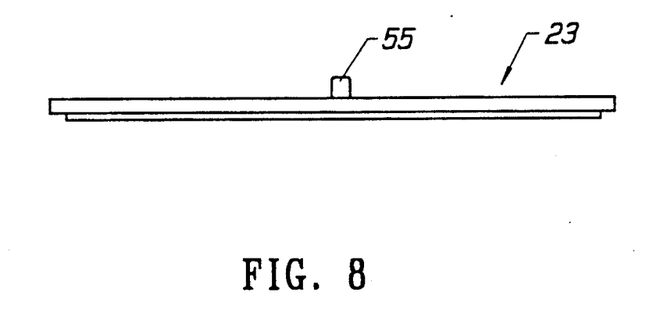
FIG. 8 is a side elevation view of a heater core assembly according to the present invention.
Figure 9:
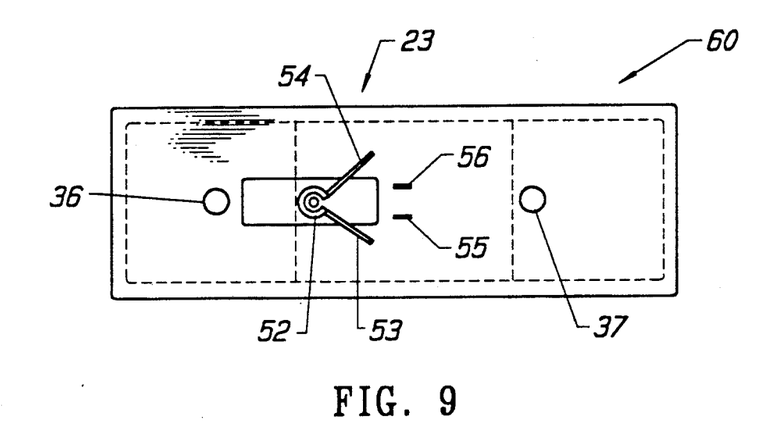
FIG. 9 is a top plan view of FIG. 8.
Figure 10:
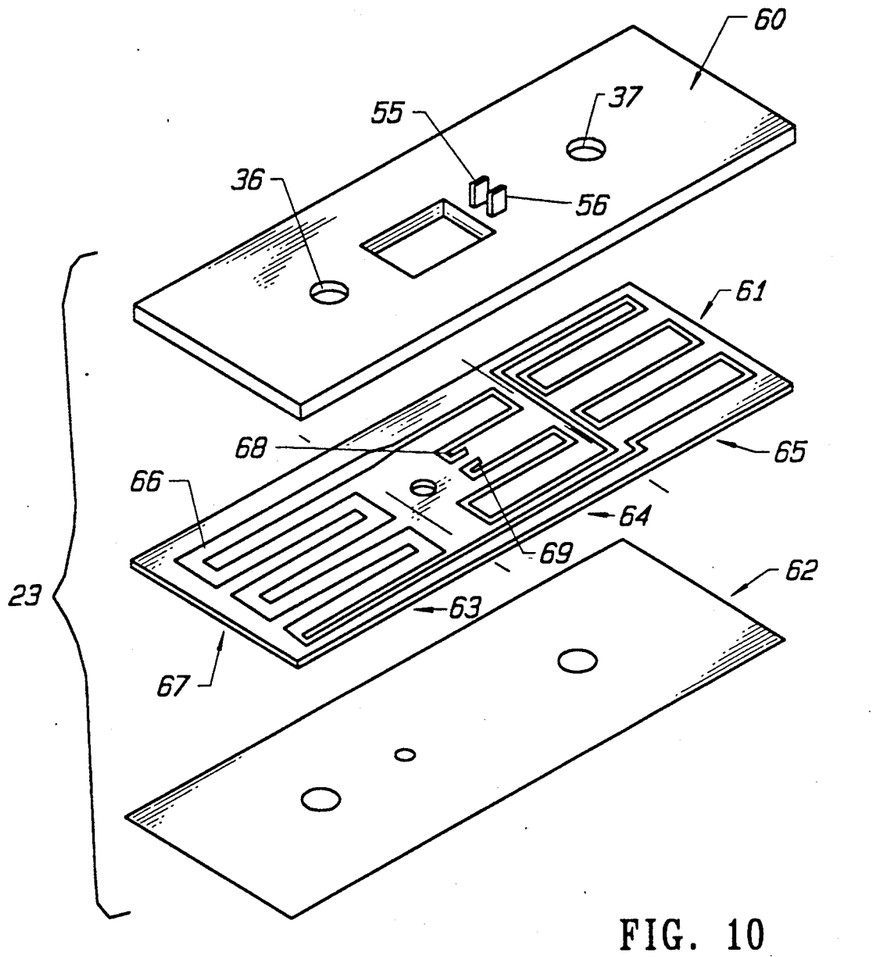
FIG. 10 is an exploded view of the heater core of FIGS. 8 and 9.

Referring to FIGS. 8-10, there is provided in the heater core assembly 23 a heat insulator 60, a planar heating element 61 and an insulator film 62. The heat insulator 60, which is about 0.18 inches thick and made from a ceramic fiber compound available from Thermal Circuits, Salem, MA, is provided in conjunction with the heat shield 19 for shielding the upper surfaces of the base assembly 23 and handle 11 from heat generated by the heating element 61 and for directing the heat from the heating element 61 downwardly into the sole plate 24. The upper exposed surface of the iron is thus kept below 300° F., the temperature at which most carpet backings melt. The insulating sheet 62 is provided for electrically insulating the electrical heating element 61 from the metallic sole plate 23.

In the heating element 61 there is provided, as shown by broken lines, three heating zones 63, 64 and 65. In each of the heating zones 63-65 there is provided a pattern of flat ribbon material 66 which is supported on a substrate 67. The width of the ribbon and the density of the ribbon pattern in each of the heating zones determines the amount of heat generated thereby when power is applied to the ends 68 and 69 of the ribbon, which are located in the center heating zone 64. The ends 68 and 69 are electrically connected to the upstanding terminal members 55 and 56. Because of the cross-section of the ribbon and the density of the ribbon pattern in each of the heat zones 63, 64 and 65, the amount of heat produced in each of the heat zones, relative to each other, comprises a high, medium and low temperature, respectively.

Figure 11:
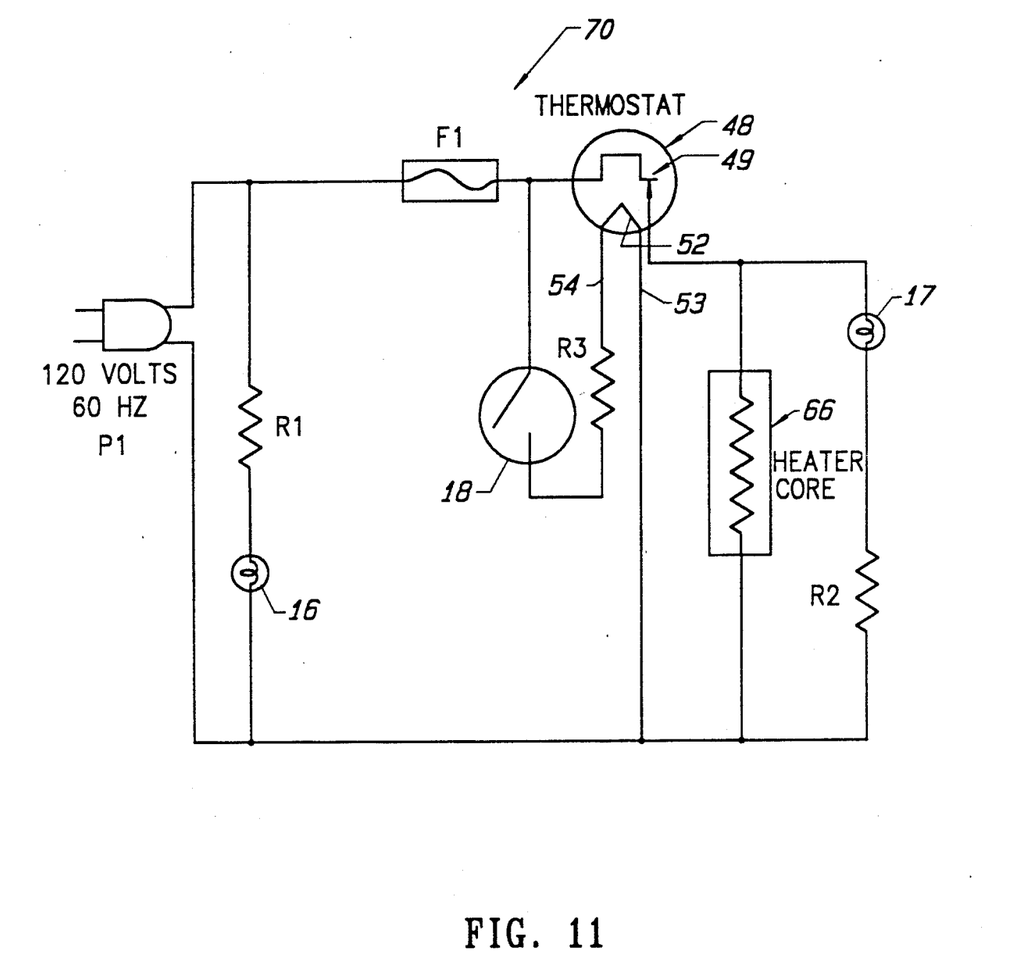
FIG. 11 is a schematic of an electrical circuit according to the present invention.

Referring to FIG. 11, there is provided according to the present invention an electrical circuit designated generally as 70. In the electrical circuit 70 there is provided the resistors R1, R2 and R3. Coupled in series with the resistor R1 there is provided the green indicating light 16. Coupled in series with the resistor R2 there is provided the red indicating light 17. Resistor R1 and the indicating light 16 are coupled across a conventional male electrical plug P1 for coupling the iron 10 to a 120-volt, 60 Hz electrical power source. Coupled in series with the plug P1 there is provided a thermo fuse F1. Coupled in series with the fuse F1 there is provided the thermostat 48 having a contact 49 which opens at a predetermined temperature. The thermostat heating element 52 is shown located adjacent to the thermostat 48. Coupled in series with the heating element 52 there is provided the resistor R3 and the high/low switch 18.

In operation, the plug P1 is inserted in a conventional wall socket. The power provided thereby is applied across resistor R1 and indicator light 16, illuminating the light 16, through the fuse F1, the contact 49 of the thermostat 48, across the heating element 66 of the heater core 23 and across the resistor R2 and indicator light 17. As long as the contact 49 is closed, power will be applied to the element 66 causing the element 66 to heat and across the series resistor R2 and indicator light 17 causing the light 17 to be illuminated. When the temperature in the vicinity of the thermostat 48 rises to the predetermined temperature for opening the contact 49, the contact 49 will open, removing the power applied to the heating element 66 and the indicating light 17, extinguishing the light 17. These conditions will exist when the switch 18 is in its open or high position.

When a proportionately lower heat level is desired from each of the heating zones 63-65, the switch 18 is moved to its low heat position, closing the switch 18. With switch 18 closed, power is applied through the switch 18 across resistor R3 and the heating element 52, the resistor R3 serving as a current limiting resistor. As the heat due to the heating element 52 is generated, the temperature in the vicinity of the thermostat 48 is increased. When the temperature in the vicinity of thermostat 48 reaches the predetermined temperature at which the contact 49 opens, the contact 49 will open, removing the power applied to the heating element. In this manner, both a high and a low heat level can be obtained in each of the heat zones 63-65 using a conventional fixed temperature thermostat.

In a typical embodiment of the present invention, the resistors R1, R2 and R3 each comprise 1200 ohms. The heating ribbon 66 in the heating element 61 of the heater core 26 comprises 19 ohms. Lamps 16 and 17 comprise 120-volt, 0.10 amp green and red lamps, respectively. The fuse F1 comprises a thermal fuse. The heating element 52 in the thermostat 48 comprises a 10-watt switchable heater element. The plug P1 comprises a 120-volt, 0.10 amp plug with cord and strain relief. All wiring in the iron 10 comprises multi-strand cord with high temperature sleeving.

Figure 12:
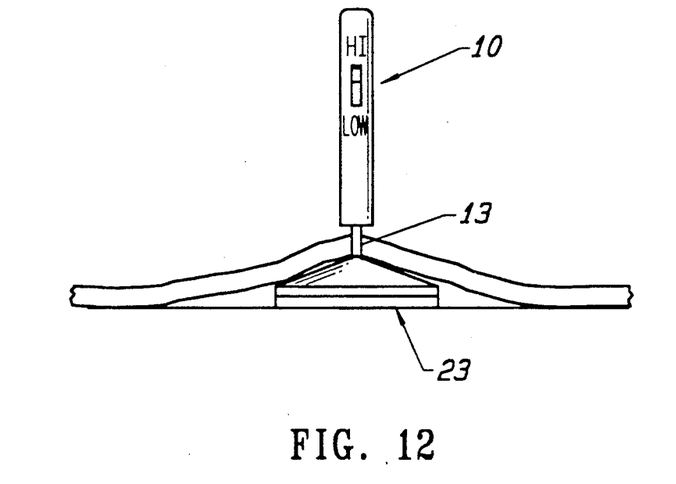
FIG. 12 is a front elevation view of a carpet seaming iron according to the present invention showing how the edges of a carpet are separated by the ultra thin strut according to the present invention.
Figure 13:
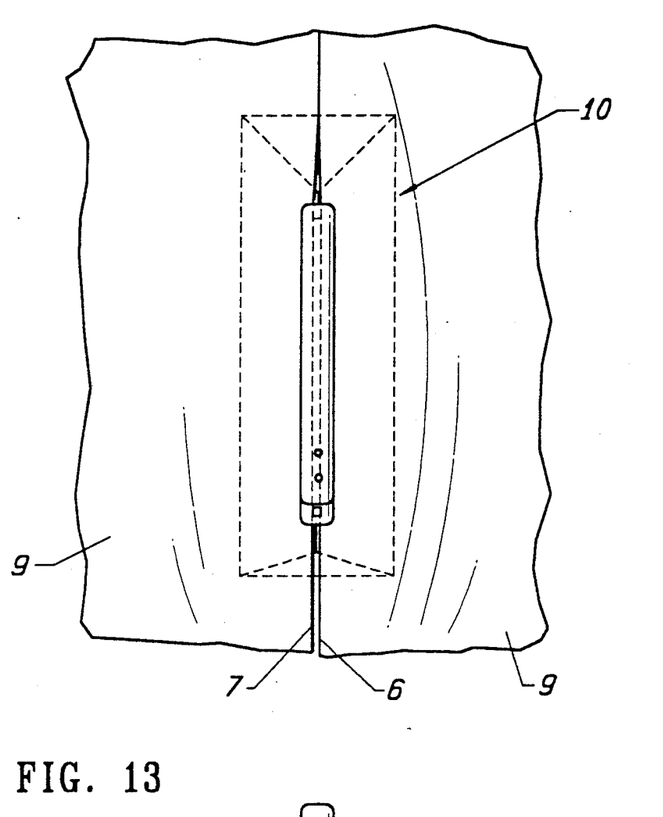
FIG. 13 is a top plan view of FIG. 12.

Referring to FIGS. 12 and 13, there is shown an embodiment of the iron 10 being used for seaming two halves of a carpet 8 and 9. As can be seen most clearly in FIG. 13, the extent to which the edges 6 and 7 of the carpet are separated is considerably reduced compared to the separation encountered using prior art carpet seaming irons as shown in FIG. 2. Indeed, it has been found that with the ultra thin guide strut 13 of the present invention, the edges 6 and 7 close almost immediately behind the iron as the iron is moved across the underlying adhesive tape. Because the edges 6 and 7 close almost immediately behind the iron as the iron is moved, certain advantages are achieved. For example, the seam tends to be tighter, making them for all practical purposes invisible. The closure occurring immediately at the rear end of the iron permits the carpet to be affixed to the adhesive tape before the temperature of the tape drops to a level which impairs good adhesion. Moreover, due to the low profile of the rear of the base assembly 12, as shown in FIG. 4, in conjunction with the ultra thin guide strut 13, the carpet edges 6 and 7 serve to more efficiently guide and center the iron 10 as it is moved between the edges 6 and 7 over the underlying adhesive tape.

While a preferred embodiment of the present invention is described above, it is contemplated that various modifications may be made thereto without departing from the spirit and scope of the present invention. For example, the number of heat zones and pattern of heating ribbon used in each of the zones may be changed to provide a greater or lesser number of heat zones and a different arrangement of temperatures. The guide strut 13 may comprise two or more spaced planar members instead of a single planar member as described. Accordingly, it is intended that the embodiment described be considered only as an illustration of the present invention and that the scope thereof should not be limited thereto but be determined by reference to the claims hereinafter provided and their equivalents.

I claim:

1. A carpet seaming iron comprising:
a handle assembly;
a base assembly having a sole plate and a heater core located adjacent to said sole plate, said sole plate having a front, middle and rear section and said heater core having means for simultaneously heating said front, middle and rear sections to high, medium, and low temperatures, respectively; and
a relatively thin guide strut member located between said handle assembly and said base assembly, the width of said strut member in a direction transverse the longitudinal axis of said iron being less than the width of said handle assembly so as to minimize the separation of the edges of a carpet as said base member is moved beneath and said strut member is moved between and parallel to said edges for heating an adhesive on an underlying tape to which the carpet is to be affixed.

2. A carpet seaming iron according to claim 1 wherein said width of said strut member is less than half said width of said handle assembly.

3. A carpet seaming iron according to claim 1 wherein each of said high, medium and low temperatures is substantially uniform across the surface of the section of the sole plate affected thereby.

4. A carpet seaming iron according to claim 1 wherein said base assembly comprises means coupled to said heater core for controlling the magnitude of said high, medium and low temperatures.

5. A carpet seaming iron according to claim 4 wherein said temperature controlling means comprises means coupled to said heater core for changing the magnitude of the temperature of each of said plurality of sections of said sole plate from a first temperature to a second temperature.

6. A carpet seaming iron according to claim 5 wherein said temperature changing means comprises:
thermostat coupled to said heater core for connecting a source of power to said heater core when the temperature in the vicinity of said thermostat is less than a predetermined temperature; and
a heating element located adjacent to said thermostat, said heating element being selectively controlled by a switch means for selectively increasing the temperature in the vicinity of said thermostate to said predetermined temperature so as to cause said thermostate to remove power from said heater core when the temperature in the vicinity of said thermostate due to heat from said heater core is less than said predetermined temperature.

7. A carpet seaming iron according to claim 1 wherein said heater core comprises a relatively flat ribbon of heat producing material having three different predetermined patterns, each of which is supported on a planar substrate in each of said front, middle and rear sections, respectively, for providing said high, medium and low temperatures, respectively.

8. A carpet seaming iron according to claim 1 comprising a planar sheet of thermally insulating material having a substantially uniform thickness of less than 0.3 inches for thermally shielding the upper surfaces of said base assembly from heat generated by said heater core and for directing heat from said heater core to said sole plate so as to restrict the temperature of said upper surfaces to a predetermined temperature which is less than that required to melt carpet backing when said front, middle and rear sections are raised to their maximum temperatures.

9. A carpet seaming iron according to claim 8 wherein said planar sheet of thermally insulating material is attached to the top of said heater core.

10. A carpet seaming iron according to claim 8 wherein said predetermined temperature is less than 300° F.

11. A carpet seaming iron according to claim 9 wherein said planar sheet of thermally insulating material comprises ceramic fiber material.

12. A carpet seaming iron according to claim 11 wherein said sheet is approximately 0.18 inch thick.

* * * * *